April 15, 1941. W. ENGEL ET AL 2,238,256

METHOD OF MAKING CONTAINERS

Filed Jan. 12, 1938     5 Sheets-Sheet 1

INVENTORS
WILLIAM ENGEL
HARRY A. REINHARDT
BY
ATTORNEY

April 15, 1941.　　　W. ENGEL ET AL　　　2,238,256
METHOD OF MAKING CONTAINERS
Filed Jan. 12, 1938　　　5 Sheets-Sheet 2
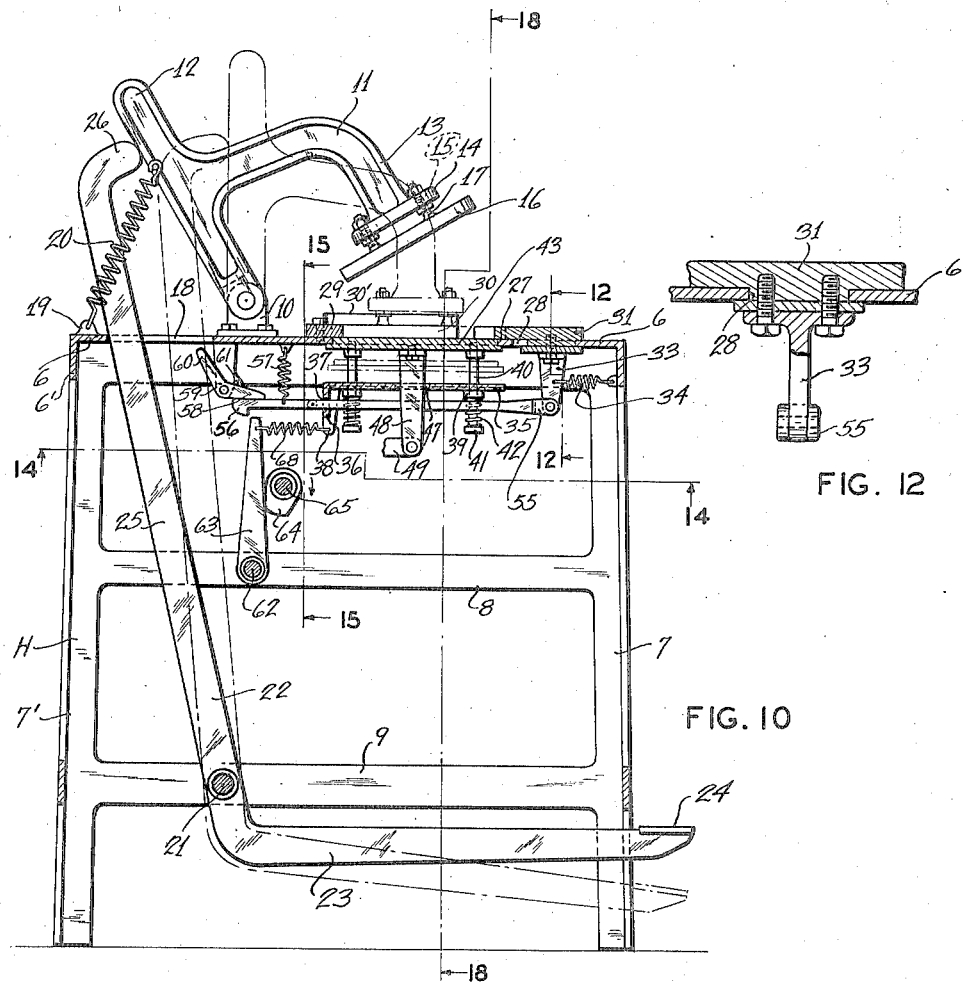
FIG. 12
FIG. 10
FIG. 11
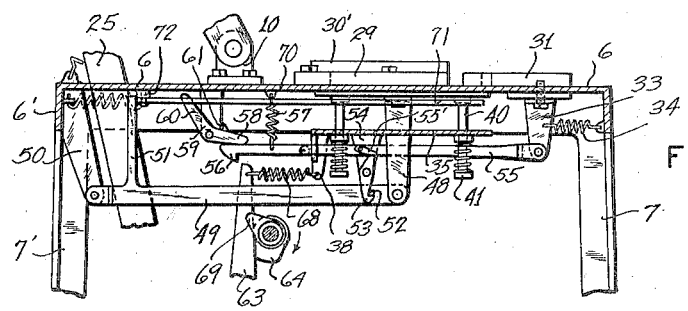
INVENTORS
WILLIAM ENGEL
HARRY A. REINHARDT
By
ATTORNEY April 15, 1941.    W. ENGEL ET AL    2,238,256
METHOD OF MAKING CONTAINERS
Filed Jan. 12, 1938    5 Sheets-Sheet 3
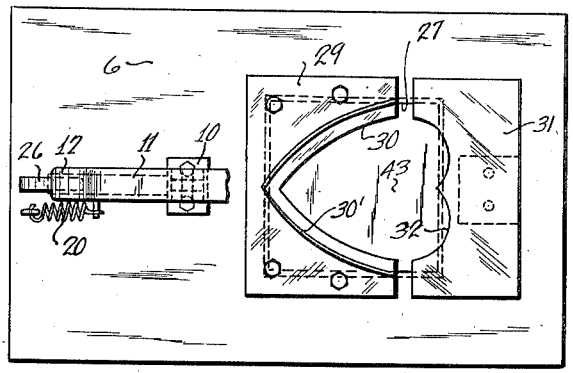
FIG. 13
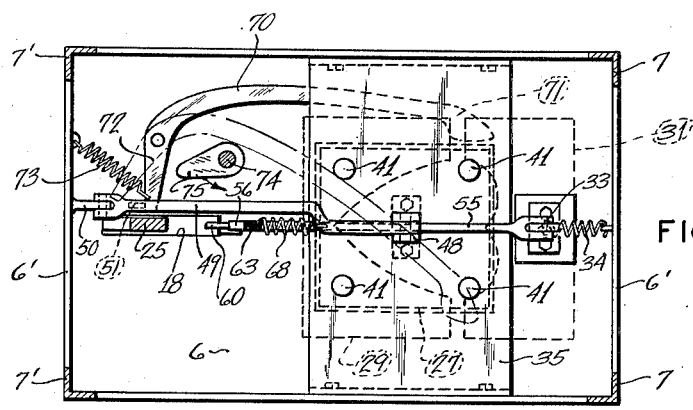
FIG. 14
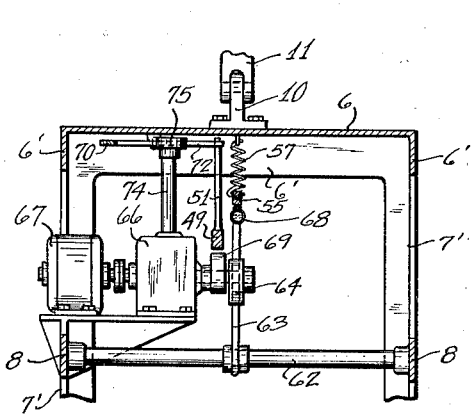
FIG. 15
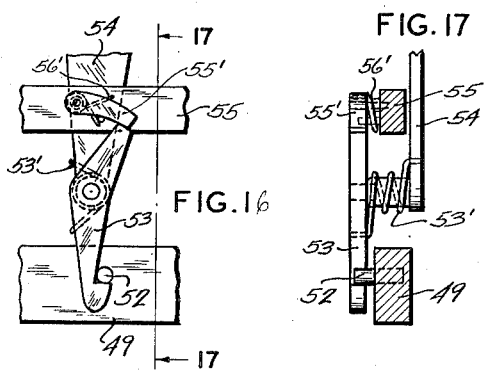
FIG. 16
FIG. 17
INVENTORS
WILLIAM ENGEL
HARRY A. REINHARDT
ATTORNEY.

April 15, 1941.  W. ENGEL ET AL  2,238,256
METHOD OF MAKING CONTAINERS
Filed Jan. 12, 1938  5 Sheets-Sheet 4
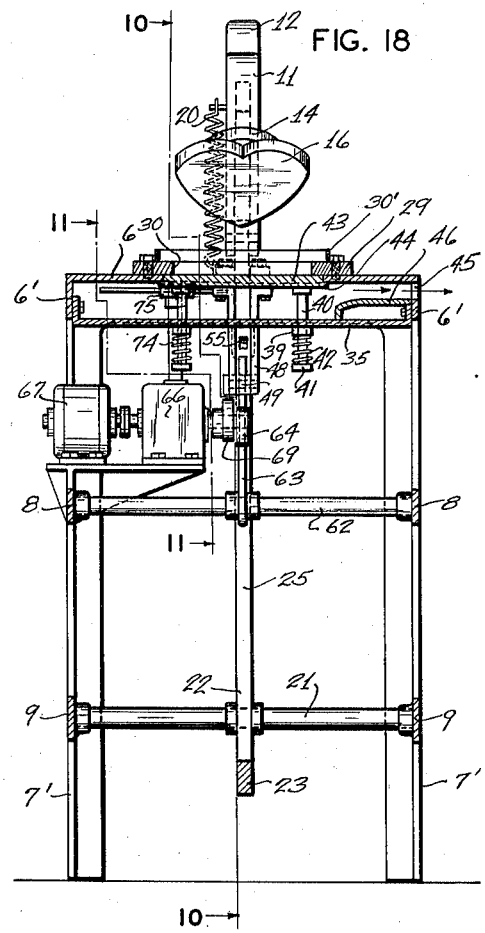
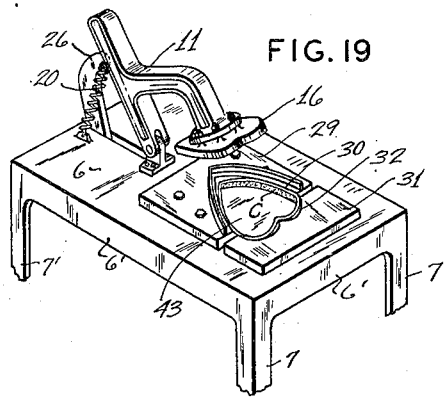
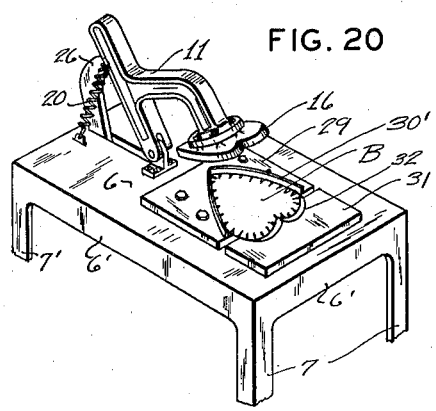
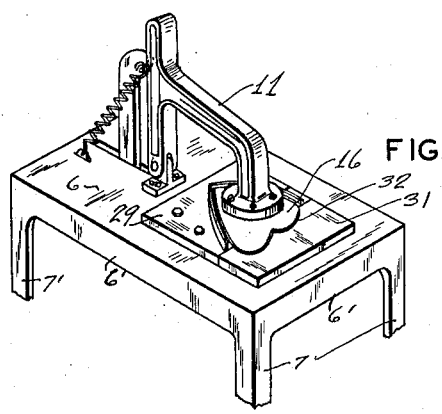
INVENTORS
WILLIAM ENGEL
HARRY A. REINHARDT
BY
ATTORNEY.

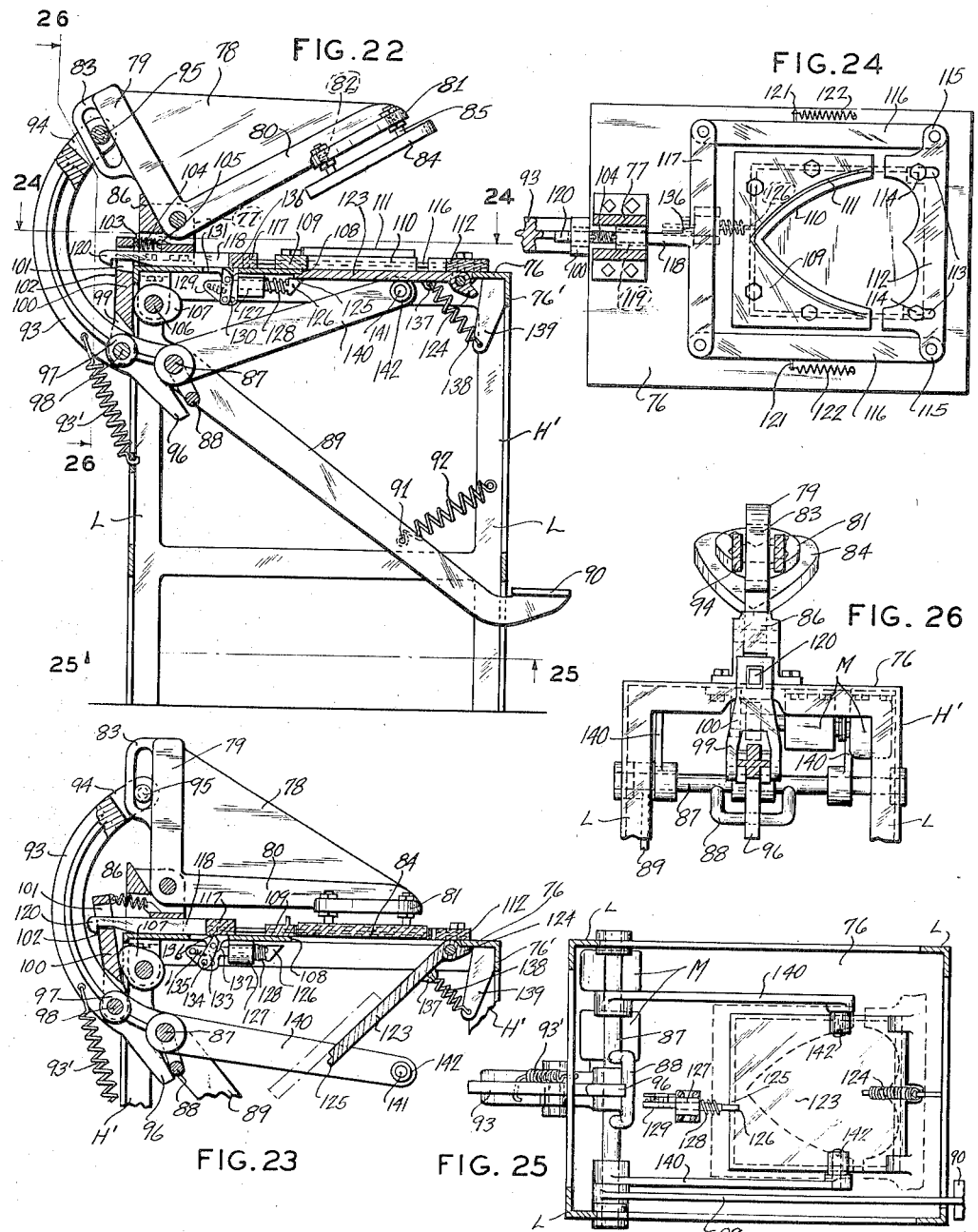

Patented Apr. 15, 1941

2,238,256

UNITED STATES PATENT OFFICE 2,238,256

METHOD OF MAKING CONTAINERS

William Engel, Clayton, and Harry A. Reinhardt, St. Louis, Mo., assignors to Universal-Engel Paper Box Co., Inc., St. Louis, Mo., a corporation of Missouri Application January 12, 1938, Serial No. 184,580

6 Claims. (Cl. 93—39)

This invention relates in general to containers and, more particularly, to containers of the decorative or so-called fancy type, such as, for instance, heart-shaped valentine boxes, and particularly to a method for making the same.

As will be understood by those familiar with the art of manufacturing containers, containers usually comprise some form of bottom, which is, in turn, provided in some suitable manner with upstanding receptacle-forming side walls. In the case of straight-sided boxes, such as, for instance, rectilinear candy boxes, the entire bottom shell may be stamped or otherwise formed out of a single piece of material and provided with suitable corner-tabs by which the side walls may be secured each to the other in the formation of the receptacle. If desired, a second piece of cardboard or other container material may be secured on the bottom in the provision of a fancy outwardly extending flange commonly referred to in this industry as an "extension." The top of the container may be similarly manufactured for telescoping fit over the bottom, as is customary in this type of container.

When it is desired, however, to manufacture a container of non-rectilinear contour, such as, for instance, oval-shaped candy or floral containers or heart-shaped valentine boxes, it is impossible, so far as we are aware, to cut the bottom and side wall forming members, respectively, of the container from a single piece of material. Instead it is necessary to cut out the bottom in the desired shape and form the side wall from a continuous strip. Ordinarily this strip is attached to the bottom-forming member by providing the strip with a series of inwardly extending bent-over tabs, which may be glued flatwise upon the face of the bottom-forming member.

Containers manufactured in such manner have never been entirely satisfactory, for the reason that the bent-over tabs do not form a sturdy and rigid connection. In addition, such tabs do not form an absolutely tight and continuous joint, so that such containers frequently have very small cracks or spaces between the bottom and the side wall. In addition, further, the containers so formed are, at best, an approximation, for it will be readily appreciated that each bent-over tab is a plane surface which has been bent over from a curved surface. The marginal edge at which the bent-over tab joins the side wall must necessarily be a straight line. Thus, the side wall actually consists of a plurality of flat angularly disposed surfaces which, in reality, conform to chords of the true curve of the side wall. True conformity to the desired side wall curve can only be obtained by mutilation of the side wall and the bent-over tab at the point of connection therebetween, which introduces weakness in the container.

Finally, containers made in this conventional manner must, so far as we are aware, be manually assembled and, hence, are necessarily much more expensive than containers which may be assembled by automatic machinery.

Our invention hence has for its primary objects the provision of a new and improved container of the type stated, which is simple and economical in construction, which conforms accurately and uniformly to the desired curve upon which the container is built without sacrificing any rigidity, strength, or attractiveness of appearance, and which may be readily manufactured at an exceptionally low cost and, if desired, by the use of automatic machinery.

It is also an object of our invention to provide mechanical means for manufacturing containers of the type stated, which is fast and accurate in operation, which is economical in construction, operation, and maintenance, and which is highly efficient in the performance of its intended functions.

And with the above and other objects in view, our invention resides in the novel features of form, construction, arrangement, method, process, and combination of the several parts presently described and pointed out in the claims.

In the accompanying drawings (5 sheets)—

Figure 10 is a vertical sectional view of a preferred form of machine for forming containers of the type stated, taken along the line 10—10, Figure 18;

Figure 11 is a fragmentary vertical sectional view of the machine, showing in more detail the base plate elevating mechanism thereof, taken on the line 11—11, Figure 18;

Figure 12 is a fragmentary transverse sectional view of the machine, showing in detail the construction of the side wall former slide mechanism, taken along the line 12—12, Figure 10;

Figure 13 is a top plane view of the machine;

Figure 14 is a horizontal sectional view of the machine, taken approximately along the line 14—14, Figure 10;

Figure 15 is a transverse sectional view of the machine, taken approximately along the line 15—15, Figure 10;

Figure 16 is a fragmentary detail view of the base-plate latching mechanism of the machine;

Figure 17 is a transverse sectional view of the base-plate latching mechanism of the machine, taken approximately along the line 17—17, Figure 16;

Figure 18 is a transverse sectional view of the machine, taken approximately along the line 18—18, Figure 10;

Figures 19, 20 and 21 are diagrammatic perspective views, illustrating the machine in the various steps in the container-forming operation;

Figure 22 is a vertical sectional view of a modified form of container-forming machine constructed in accordance with and embodying our present invention;

Figure 23 is a fragmentary vertical sectional view of the machine, showing the base plate in downwardly open position;

Figure 24 is a horizontal sectional view of the machine, taken approximately along the line 24—24, Figure 22;

Figure 25 is a horizontal sectional view of the machine, taken approximately along the line 25—25, Figure 22; and Figure 26 is a fragmentary vertical sectional view of the machine, taken approximately along the line 26—26, Figure 22.

Figure 1:
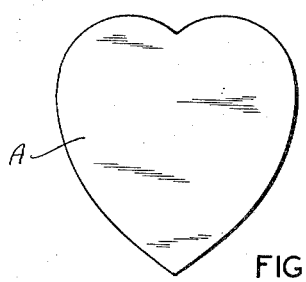
Figure 1 is a plan view of the so-called extension member of a heart-shaped container constructed in accordance with and embodying our present invention.
Figure 2:
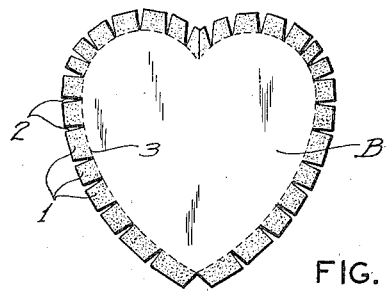
Figure 2 is a plan view of the bottom member of the heart-shaped container.
Figure 3:
Figure 3 is a plan view of the side wall strip of the container.

Referring now in more detail and by reference characters to the drawings, which illustrate a preferred embodiment of the present invention, A designates a preferably heart-shaped extension member which may be die-cut or otherwise formed from any suitable container material, such as cardboard or the like. B designates the so-called bottom blank, which is likewise die-cut from any suitable container-forming material, such as cardboard, and is provided with a plurality of outwardly extending somewhat rectangular marginal tabs 1, which are in length equivalent to the desired depth of the finished container member and are separated from each other by V-like notches 2, which are so shaped that the tabs, when bent into upright position along the continuous score line 3, will be substantially contiguous, as best seen in Figure 5.

Figure 4:
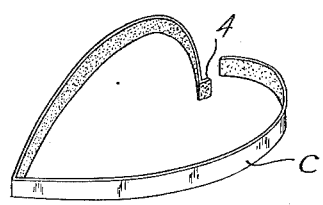
Figure 4 is a perspective view of the side wall strip folded into side wall-forming position.

C designates an elongated rectangular side wall-forming strip likewise cut from any suitable container-forming material, such as cardboard, being in width equal to the desired depth of the container and being in length somewhat longer than the length of the peripheral outline thereof, for purposes presently more fully appearing. The side wall-forming member C is bent in heart-shaped conformation, as shown in Figure 4, and at its one extremity bent backwardly to form an attachment tab 4, which may subsequently be stapled, glued, or otherwise secured to the other extremity of the side wall-forming strip C.

Figure 5:
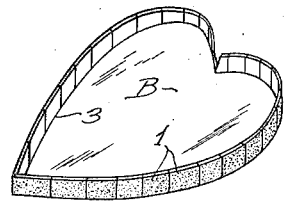
Figure 5 is a perspective view of the bottom member folded into container-forming position.
Figure 6:
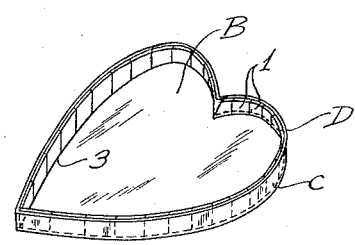
Figure 6 is a perspective view of the bottom-forming member and the side wall-forming member joined together in container-forming relation.
Figure 7:
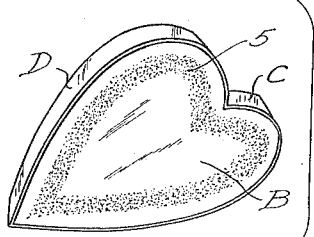
Figure 7 is a perspective view of the container shell and the extension member prior to completion thereof.
Figure 8:
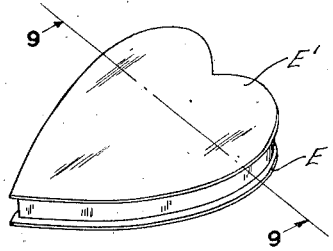
Figure 8 is a perspective view of the finished container.

The marginal tabs 1 of the bottom blank B may, if desired, be manually bent upwardly, as shown in Figure 5, and a coating of glue or other suitable adhesive is applied thereto. Likewise a coating of glue or other suitable adhesive is applied to the inner face of the bent side wall-forming member C and the latter is securely wrapped in side wall conformation around the upwardly bent marginal tabs 1, the attachment tab 4 thereof being secured to the other end of the side wall-forming member, and securely held in this position until the glue has permanently set, in the formation of the container shell D, all as best seen in Figure 6. The under face of the shell D is then coated with a line of glue or other adhesive 5 and the extension member A applied thereto in the formation of a completed container bottom E. It will, of course, be evident to those skilled in this art that in many cases it will not be necessary to apply glue to all of the surfaces being secured together. Thus, for instance, it may be desirable to apply a coating of glue either to the tabs 1 or the side wall member C without coating each.

We have also found that our present method of container manufacture may be manually carried out in very convenient fashion by providing any suitable type of skeleton-work form into which the annular side wall member C may be quickly inserted after its respective ends have been secured together whereby to hold the side wall member C in the desired container shape. The bottom blank B appropriately cut and scored may then be placed over the upwardly presented marginal edge of the side wall member C with the score line 3 in substantial registration therewith. The marginal tabs 1 of the bottom blank B and the inner face of the side wall C should preferably be prepared for adhesive attachment one to the other either by applying a coating of glue to the side wall member C or the appropriate faces of the marginal tabs 1, as has been above pointed out. The bottom blank B may thereupon be pressed downwardly into the shaped side wall C, whereupon the marginal tabs 1 will simultaneously be bent upwardly along the score line 3 and may then be pressed against the side wall C where they will be rigidly held by the adhesive when the latter sets. After the bottom blank B has been forced downwardly into the shaped side wall C, the tabs and side wall will, in effect, be molded together by running the finger along the inwardly presented faces of the tabs to insure tight adhesive juncture between the marginal tabs 1 and the inner face of the side wall C.

Figure 9:
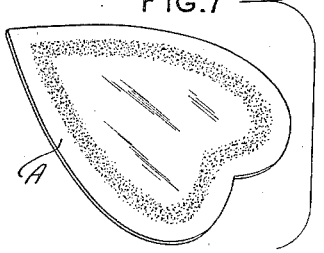
Figure 9 is a transverse sectional view of the container, taken approximately along the line 9—9, Figure 8.
Figure 9:
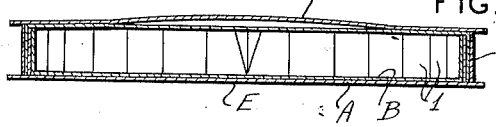

A top or cover member E' may then be formed in identically the same manner as above described for the container bottom, the respective parts being suitably enlarged, so that the side wall of the top or cover member E' will fit in telescoped fashion over the side wall of the container bottom, as best seen in Figure 9.

It should be understood that while we have preferred to illustrate the application of our present invention in the formation of a heart-shaped valentine box, it will also be possible to form boxes of various other shapes, such as oval boxes and Easter boxes having egg-shaped contour or even boxes having highly irregular contours, such as Easter boxes having a shape in simulation of the so-called "Easter bunny."

One preferred form of machine for manufacturing the container shells D in accordance with our present invention and as above described preferably comprises a machine base H having a preferably integrally formed horizontal top plate 6 having a downwardly depending peripheral flange 6' and a plurality of front and rear supporting legs 7, 7', re-inforced and intermediately connected by horizontal cross bars 8, 9.

Rigidly mounted on the upper face of the top plate 6, is an upstanding journal pedestal 10 for swingably supporting a head frame 11 having an upright leg 12 and an integrally formed outwardly and downwardly extending side arm 13 provided at its extremity with an integrally formed downwardly presented flat head plate 14, the latter being provided with a plurality of apertures 15. Provided for removable disposition upon the head plate 14, is a shell-former 16 shaped to conform to the desired interior contour of the container shell D and being provided on its upper face with a plurality of upwardly extending threaded studs 17 in registration with the apertures 15, whereby the former 16 may be rigidly bolted to the head plate 14, as best seen in Figure 10.

Immediately to the rear of the journal pedestal 10, the top plate 6 is provided with a longitudinally extending slot 18. Between the rear margin of the slot 18 and the rearward edge of the top plate 6, is an upstanding transversely apertured boss 19 for receiving one end of a substantially heavy tension spring 20, which, at its other end, is connected to the straight leg 12 of the head frame 11 for resiliently urging the head frame into backwardly swung position, as shown in full lines in Figure 10.

Mounted rigidly at its ends in, and extending transversely between, the cross braces 9, is a shaft 21 for rotatably supporting a large bellcrank 22 having a horizontal leg 23 extending forwardly between the front legs 7 of the machine base H and outwardly therebeyond, being provided at its extremity with a conventional foot pedal 24, the bell-crank 22 further having an upwardly extending elongated leg 25, which, at its upper extremity, is disposed through, and for free movement in, the slot 18 and is at its upper end provided with an inwardly bent-over arcuately faced head portion 26 for sliding engagement with the rearwardly presented face of the head-frame leg 12, all as best seen in Figure 10.

It will be evident that the spring 20 will normally swing the head-frame 11 backwardly in the journal pedestal 10 and, accordingly, hold the bell-crank leg 25 in rearwardly disposed position, as shown in full lines in Figure 10. The horizontal bell-crank leg 23 will, obviously, be disposed in upward position, also as shown in full lines in Figure 10. When the operator depresses the foot pedal 24, the leg 23 will swing downwardly, the leg 25 will accordingly swing forwardly, and the head portion 26 thereof will simultaneously slide along the rearwardly presented face of the head-frame leg 12, thereby swinging the head-frame forwardly against the action of the spring 20, and shifting the shell-former 16 downwardly to the position shown in dotted lines in Figure 10, all for purposes presently more fully appearing.

Forwardly of the journal pedestal 10, the top plate is provided with a relatively large rectangular opening 27, which is positioned for somewhat symmetrical registration with the shell-former 16 when the latter is in downwardly shifted position. The top plate 6 is further provided, forwardly of the aperture 27, with an elongated guide slot 28 preferably in lengthwise alignment with the slot 18, all for purposes presently more fully appearing and as best seen in Figures 10, 12, and 13.

Removably bolted upon the upwardly presented face of the top plate 6, is a side wall former 29 positioned for extension flatwise over the upper face of the top plate and for projection outwardly over the aperture 27. This side wall former 29 is shaped along its forwardly presented edge 30 to conform to a section of the desired side wall curve and being provided on its upper face with an upstanding guide or stop flange 30' parallel to and spaced inwardly from the forward edge 30. It will, of course, be evident in the present instance that the forward edge 30 of the side wall former 29 is shaped in the contour of the point portion of a heart, all as best seen in Figure 13.

Slidably mounted in the guide slot 28 for movement flatwise over the upwardly presented face of the top plate 6, is a complementary side wall former 31 having a forward edge 32 contoured to conform to a portion of the side wall and being complementary to the forward edge 30 of the stationary side wall former 29, so that when the slidable side wall former 31 is moved forwardly into abutment with the stationary side wall former 29, the respective forward edges thereof will meet in endwise registration and conform completely to the desired side wall curve, as best seen in Figure 13.

Bolted or otherwise rigidly secured on the under side of the slidable side wall former 31, is a downwardly extending arm 33 biased by the spring 34 for forward movement, whereby the slidable former 31 will normally be urged away from operative engagement with the stationary former 29, as best seen in Figures 10 and 11.

Mounted rigidly at its ends on, and extending transversely between, the downwardly depending flange portion 6' of the top wall 6, is an under plate 35, which is slightly greater in width than the top plate aperture 27 and is positioned directly therebeneath, having along its rearwardly presented margin a downwardly extending arm 36 provided with a vertical slot 37 and a spring-retaining shoulder 38, all for purposes presently more fully appearing and as best seen in Figures 10 and 11.

The under plate 35 is further provided with preferably four vertical bushed apertures 39 for receiving the vertical slide rods 40 extending therethrough for vertically slidable movement and being provided at their lower extremities with preferably integrally formed annular flanges 41 for abuttingly engaging the compression springs 42, which, in turn, at their other ends abuttingly engage the downwardly presented faces of the bushed apertures 39 for normally urging the slide rods 40 downwardly. At their upper extremities the slide rods 40 are provided with a base plate 43 shaped for close fitting disposition in the aperture 27, being provided with an outwardly extending peripheral flange 44 for engagement with the downwardly presented face of the top plate 6 and being of such shape and dimension that the upper face of the base plate 43 will lie precisely in the plane of the upper face of the top plate 6 when the base plate 43 is disposed through the aperture 27, all as best seen in Figure 18.

One downwardly depending side flange 6' of the top plate 6 is provided with an elongated horizontal slot or aperture 45, a slide shelf 46 being mounted adjacent the lower margin thereof and extending inwardly over the under plate 35 to a point adjacent the near margin of the base plate 43, as best seen in Figure 18 and for purposes presently more fully appearing. The under plate 35 is centrally provided with a slot 47 through which extends an arm 48 rigidly bolted or otherwise secured at its upper extremity to the under face of the base plate 43 and at its lower extremity pivotally connected to one end of a lever arm 49, which is, in turn, at its other end pivotally connected to a downwardly depending stationary leg 50 rigidly mounted on the under face of the top plate 6. The lever arm 49 is further provided with an upwardly extending side arm 51 positioned inwardly of but adjacent the stationary leg 50 and is further provided adjacent the arm 48 with an outwardly extending latch pin 52 positioned for latching engagement with the detent end of a latch 53, pivotally mounted on a downwardly depending stud member 54, which is, in turn, mounted rigidly on the downwardly presented face of the under plate 35, the latch 53 being urged resiliently into pin-engaging position by the wire-spring 53', all for purposes presently more fully appearing and as best seen in Figure 11.

Pivotally mounted at its one end to the lower extremity of the slidable side wall former arm 33, is a horizontal link 55 extending forwardly through the slot 37 in the under plate flange 36 and being pivotally provided at its forward end with a detent hook 56, which is biased upwardly by means of the spring 57 against the downwardly presented edge face of the horizontal leg 58 of a bell-crank 59, which is, in turn, pivotally mounted on the machine base and is provided with a vertical leg 60, the upper end of which is interposed in the path of the vertical leg 25 of the large bell-crank 22, the bell-crank 59 being limited against outward movement by means of the stop pin 61, all for purposes presently more fully appearing and as best seen in Figures 10 and 11.

Intermediate its ends, the link 55 is provided with a pivoted disengagement pawl 55' positioned above the upper end of the latch 53 and being resiliently urged downwardly by the spring 56' for tripping engagement therewith, in a manner and for purposes presently more fully appearing and as best seen in Figure 11.

Rotatably mounted in and extending transversely between the cross bars 8 of the machine bed, is a shaft 62 for swingably supporting an upwardly extending radial arm 63 having a forwardly presented vertical face for engagement with the primary actuating cam 64 mounted on the drive shaft 65 of a conventional reduction gear box 66, which is, in turn, operatively connected to any suitable prime mover, such as the electric motor 67, as best seen in Figures 10 and 15. The radial arm 63 is apertured adjacent its upper extremity for receiving one end of a tension spring 68, which, at its other extremity, is connected to the spring-supporting boss 38 for resiliently urging the radial arm 63 forwardly into continuous cam engagement. The radial arm 63 is of such length that it will be positioned adjacent the hook detent 56 and yet will not be in engagement therewith, as best seen in Figures 10 and 11. The drive shaft 65 is further provided with a secondary cam 69, which is positioned for intermittent engagement with the downwardly presented horizontal edge of the lever arm 49, for purposes presently more fully appearing and as best seen in Figure 11.

Pivotally mounted on the under face of the top plate 6, is a kick-off arm 70 having a forwardly extending leg 71 arranged for sweeping movement beneath the aperture 27 and having a short transverse leg 72 extending laterally in front of and for latching engagement with the upwardly extending arm 51 of the lever arm 49, the latter being apertured adjacent its end for receiving one extremity of a tension spring 73, which is, in turn, rigidly mounted at its other end to the machine base H for normally urging the kick-off arm 70 from the latched position shown in full lines in Figure 14 to the unlatched position shown in dot and dash lines in Figure 14. Extending upwardly from the reduction gear box 66, is a vertical shaft 74 provided at its upper end with an auxiliary cam 75 disposed for intermittent engagement with a vertical margin of the kick-off arm 70, as best seen in Figure 14 and for purposes presently more fully appearing.

In actual use, the machine and its respective parts will be initially disposed as shown in Figure 10, that is to say, the foot pedal 24 will be in upwardly disposed position, the head-frame 11 will be urged backwardly, and the former 16 will be accordingly shifted upwardly out of operative position. Similarly the slidable side wall former 31 will be pulled forwardly out of operative position by the action of the spring 34 and the horizontal link 55 will accordingly be disposed in forward position, the hook detent member 56 at the end thereof being urged upwardly by the spring 57 out of the path of the upper end of the radial arm 63 and against the under face of the forward leg 58 of the bell-crank 59, the vertical arm 60 of the bell-crank 59 being accordingly urged forwardly into the path of the large bell-crank arm 25. Likewise the base plate 43 is held in upwardly disposed position against the downward bias of the compression springs 42 by means of the latch pin 52, which is latchingly held by the swinging latch 53. The disengagement pawl 55' meanwhile rests resiliently against the upper end of the latch 53.

The operator manually folds a side wall forming strip C, the inner face of which has been treated with a coating of glue, and loosely inserts it into the space between the forming edges 30, 32, of the side wall formers 29, 31. It will be evident that, as a result of this operation, the side wall strip C will be secured at its ends in the formation of a ring-like member and will conform roughly to the desired side wall contour but will not conform precisely thereto until a later stage in the operation of the machine. The operator thereupon inserts a flat bottom blank member, which preferably comes to the machine unglued. This bottom blank is fed into the machine against the guide flange 39', which positions the bottom blank in such a manner that the continuous score line 3 thereof will be in substantially overlying registration with the upwardly presented margin of the side wall strip C. The operator thereupon steps upon the pedal 24, swinging the bell-crank arm 23 downwardly. The vertical bell-crank arm 25 thereupon swings forwardly, pivoting the head-frame 11 forwardly and downwardly against the action of the spring 20, as above described, and thereby bringing the shell-former 16 downwardly on top of the bottom blank B. As the bell crank arm 25 swings forwardly and before it reaches the forward limit of its travel, it engages the bell-crank 59, pivoting it forwardly so that the horizontal arm 58 thereof is swung downwardly, urging the hook detent 56 downwardly against the action of the spring 57 into the path of the radial arm 63.

Meanwhile, the electric motor 67 is in continuous rotative operation and through the conventional gear reduction box 66 is rotating the drive shaft 65 and the primary cam 64, so that the radial arm 63 will be continuously swinging backwardly and forwardly against the action of the spring 68 responsive to the rotation of the primary cam 64.

As the detent hook 56 is urged downwardly, as above described, it will be interposed in the path of the radial arm 63 and carried forward with it, which forward movement is transmitted through the horizontal link 55 to the arm 33 and the slidable side wall former 31, whereby the latter is urged forwardly against the action of the spring 34. It will be evident by considering the various related parts of the machine under discussion that the forward closing movement of the side wall former will, in effect, be simultaneous with the final portion of downward movement of the former 16. As the former 16 completes this final downward movement, it will force the bottom blank B downwardly into the annular side wall forming strip C, simultaneously bending the side wall forming tabs upwardly to conform to the desired shape. Meanwhile the side wall formers are closing and compressing the side wall strips and the bent-over tabs against the vertical edges of the shell-former 16 and holding the entire assembly in this position while the glue is setting. It has been found preferable to utilize glue or other adhesive which sets very quickly, so that it will not be necessary to hold the various parts of the machine in this fixed position for an overly long period. It will, of course, be evident that the length of time of this hold-over period may be varied or regulated by adjusting the length of hold-over segment on the cam 64.

As the cam 64 continues its revolution, the radial arm 63 will swing backwardly under the influence of the spring 68, permitting the hook detent member 56 and the associated horizontal link 55 to swing backwardly with it, releasing the slidable side wall former arm 33, which is thereupon drawn backwardly under the influence of the spring 34, moving the slidable side wall former 31 backwardly out of operative engagement.

Simultaneously the operator releases the foot pedal 24, allowing the head-frame 11 and the associated former 16 to swing upwardly and backwardly under the influence of the spring 20, leaving the completely formed container member resting upon the upper face of the base plate 43.

As the horizontal link 55 moves backwardly in the manner above described, the pawl 55' will be urged downwardly under the action of the spring 56' and will engage the upper end of the latch 53, swinging the latch backwardly out of engagement with the latch pin 52, whereupon the base plate 43 will be quickly urged downwardly under the action of the springs 42, thereby lowering the completed container member to the plane of the slide shelf 46. As the base plate 43 moves downwardly, the arm 48 will also move downwardly and swing the lever arm 49 and the associated side arm 51 downwardly, so that the side arm will be disengaged from the transverse leg 72 of the kick-off arm 70, whereupon the kick-off arm 70 will be pivotally swung under the influence of the spring 73 and the forwardly extending leg 71 thereof will sweep transversely across the top of the now lowered base plate 43, throwing the completed container member outwardly across the upper face of the slide shelf 46 and through the aperture or slot 45 onto any suitable form of conveyer, the latter not being shown. The completed container shell D may then be removed for any subsequent finishing operations, such as the application of the extension member A, which may be applied either by hand or by other suitable machinery.

The auxiliary cam 75 is so positioned on the shaft 74 that it will come in contact with the forwardly extending leg 71 of the kick-off arm 70 and push the kick-off arm 70 backwardly against the action of the spring 73 into inoperative position. As the kick-off arm 70 is pushed backwardly, the secondary cam 69 will be rotated into contact with the lever arm 49 and will lift this lever arm and the associated vertical arm 48 and base plate 43 upwardly into initial position. Since the horizontal link 55 has by this time been moved to the forward limit of its travel, the pawl 55' will no longer be in engagement with the latch 53 and the latter will be in position for operative latching re-engagement with the latch pin 52 whereby to hold the base plate 43 in upwardly disposed position. Simultaneously the side arm 51 will move upwardly into latching engagement with the latch end 62 of the kick-off arm 70, thereby restoring all the parts of the machine to initial position for the repeated performance of the above described operations in the formation of a second container shell.

It will be evident in connection with the above described box-making machine that differently shaped and differently sized containers may be readily manufactured therewith by the substitution of differently shaped former members for the former 16 and the side wall formers 29, 31. It will also be evident that while the machine above described is relatively speedy in its operation, it is nevertheless somewhat more complicated and expensive than is absolutely required. Thus, for instance, if it is not necessary to employ such a high-speed machine, a somewhat slower acting machine may be utilized with attendant economies in construction.

We may hence provide a modified form of box-making machine illustrated in Figures 22 to 26, inclusive, and comprising a machine base H' having a flat top plate 76 provided with a downwardly depending peripheral side flange 76' and downwardly depending legs L. Rigidly mounted on the upper face of the top plate 76 preferably adjacent the rear margin thereof, is an upstanding journal pedestal 77 pivotally supporting a head-frame member 78 having an upwardly extending back leg 79 and a forwardly extending leg 80, the latter being provided at its forward extremity with a flat horizontally disposed head-plate 81 having a plurality of apertures 82. The head-frame back leg 79 is preferably integrally provided on its rearwardly presented face with a lengthwise slotted slide bracket 83, all for purposes presently more fully appearing and as best seen in Figures 22 and 23.

Provided for removable disposition upon the under face of the head-plate 81, is a shell-former 84 having a plurality of upwardly extending threaded studs 85 in registration with the apertures 82 whereby the former 84 may be rigidly bolted to the head-plate 81. The journal pedestal 77 is further provided at its rearward margin with an upwardly extending angularly faced stop member 86 disposed for facewise abutting engagement against the rear face of the head-frame back leg 79 when the latter is in rearwardly disposed position for limiting the upward and backward movement thereof, as best seen in Figure 22.

Journaled at its extremities in, and extending transversely between, the rear legs L of the machine base H', is a rock shaft 87, being centrally provided with a radially outwardly extending U-shaped saddle member 88, as best seen in Figures 22 and 26 and for purposes presently more fully appearing.

Rigidly mounted at its one end upon the rock shaft 87 and extending downwardly and forwardly therefrom, is a pedal arm 89 provided at its lower extremity with a horizontally presented pedal 90 extending forwardly between and beyond the front legs L of the machine base H', the pedal arm 89 being further provided intermediate its ends with an outwardly projecting pin 91 for receiving one end of a tension spring 92, which is, in turn, at its other extremity rigidly mounted at a suitable point on one of the legs L of the machine base H' for normally resiliently urging the pedal arm 89 into upward position.

Swingably mounted at its lower extremity upon the rock shaft 87 within the confines of the saddle member 88, is a curved head-frame actuating arm 93 provided at its upper extremity with an integrally formed yoke 94 for embracing engagement with the head-frame slide bracket 83 and having a transversely extending pin 95 for sliding engagement in the slot thereof. Adjacent its lower extremity, the arm 93 is provided with a preferably integrally formed downwardly extending projection 96 positioned in back of, and for abutting engagement with, the cross bar of the saddle 88, the arm 93 being apertured also adjacent its lower extremity for receiving one end of a relatively heavy tension spring 93', which is, in turn, at its other end rigidly fixed to the machine base H' for normally urging the head-frame actuating arm 93 and the associated head frame 78 rearwardly into inoperative position, as best seen in Figures 22, 23, and 26 and for purposes presently more fully appearing.

The arm 93 is further provided adjacent its lower extremity with a transversely extending bearing or journal 97 for receiving a connecting pin 98 extending transversely therethrough and rigidly mounted at its opposite extremities in the downwardly extending yoke-like arms 99 of a driving arm 100 provided at its upper extremity with a transversely extending slot 101 having an upwardly and rearwardly presented latch engagement face 102, the driving arm 100 being further provided at its upper extremity with a forwardly extending apertured boss 103 for receiving one end of a tension spring 104, which is, in turn, at its other extremity connected to a rearwardly extending apertured boss 105 formed preferably in the lower portion of the journal pedestal 77, whereby to normally urge the driving arm 100 resiliently forwardly, all for purposes presently more fully appearing and as best seen in Figures 22 and 23.

Rigidly mounted on the under face of the top plate 76, is a conventional driving motor and reduction gear assembly M having a horizontal drive shaft 106. Rigidly mounted on the drive shaft 106 for rotation therewith, is a cam member 107 positioned for peripheral engagement with the driving arm 100, whereby to produce continuous to and fro or rocking movement of the driving arm 100 against the tension of the spring 104 and responsive to the rotation of the cam 107.

The top plate 76 is provided with a rectangular aperture 108 in substantial registration with the former 84, when the latter is in downwardly disposed position. Removably mounted, as by means of bolts or other suitable attachment means, on the upper face of the top plate 76 and extending outwardly over the rectangular aperture 108, is a stationary side wall former 109 having a forward edge 110 shaped to conform to a selected portion of the desired side wall curve and being provided upon its upper face with a guide stop 111 shaped to conform to the forward edge 110 and being spaced rearwardly therefrom by a distance equal to the length of the marginal tabs 1 on the box-forming bottom blank B. Slidably mounted on the upper face of the top plate 76, is a shiftable side wall forming member 112 having a pair of parallel spaced slots 113 for sliding engagement with the retainer bolts 114 and being further provided at its side margins with outwardly extending ears 115 for releasable engagement with the forward ends of parallel connecting links 116, which are, in turn, pivotally connected at their rearward extremities with a cross yoke 117 having a centrally positioned rearwardly extending arm 118 which extends through a vertical slot 119 formed in the lower portion of the journal pedestal 77 and beyond the rear margin of the top plate 76 through the slot 101 of the driving arm 100 and being provided at its rearward extremity with a downwardly presented hook detent 120, the links 116 each being provided with outwardly extending pins 121 for retentively engaging one end of a tension spring 122, which, at its other extremity, is rigidly mounted on the upper face of the top plate 76 for resiliently urging the movable side wall former 112 and its associated mechanism forwardly into normally inoperative position, all for purposes presently more fully appearing and as best seen in Figures 22, 23, and 24.

Swingably mounted on the under face of the top plate 76 adjacent the forward margin of the rectangular aperture 108, is a base plate 123, being provided at its forward margin with a downwardly and outwardly extending stop projection 124 and at its rearward margin provided with an outwardly projecting flange 125 for latching engagement with a latch detent 126 shiftably mounted in a downwardly extending sleeve 127 and resiliently urged forwardly into latching position by the spring 128. The rearwardly extending portion of the latch detent 126 is preferably integrally provided with a flat plate member 129 provided with an arcuate slot 130. The top plate 76 is further provided with a lengthwise extending slot 131, which is positioned above the end plate 129 of the latch and is provided along its longitudinal margins with downwardly extending projections 132, which, in turn, pivotally support a trip lever 133 at its upper end projecting upwardly through the slot 131 and at its lower end provided with a pin 134 for shiftable engagement in the slot 130. Intermediate its ends the trip lever 133 is apertured for receiving one end of a tension spring 135, which is, in turn, at its other end rigidly connected to the end plate 129 for normally urging the trip lever rearwardly with respect to the slot 130. The cross yoke 117 is provided with a downwardly extending cam-like shoulder 136, which projects into the top plate slot 131 and rides over the upwardly presented end of the trip lever 133, all for purposes presently more fully appearing and as best seen in Figures 22 and 23.

The downwardly swinging base plate 123 is so positioned that its top face will lie precisely in the plane of the upper face of the top plate 76 when the base plate is in upwardly disposed position and is provided on its under face with a downwardly extending apertured boss 137 for receiving one end of a tension spring 138, which is, in turn, at its other end rigidly fastened to a downwardly extending stud 139 welded or otherwise secured to the machine bed H', all for purposes presently more fully appearing and as best seen in Figures 22 and 23.

Rigidly mounted on the rock shaft 87 for rotation therewith, is a pair of laterally spaced forwardly extending base plate lifting arms 140, each provided at its forward extremity with a laterally projecting short stub shaft 141 provided with a free running roller 142 for engagement with the under face of the base plate 123, all for purposes presently more fully appearing and as best seen in Figure 22.

As the machine is positioned for initial operation, the head-frame actuating arm 93 is pulled backwardly and downwardly by means of the spring 93', the head-frame 78 and the associated former 84 is drawn upwardly into inoperative position, and the pedal arm 89 is similarly drawn upwardly by means of the spring 92. The base plate 123 is held in upward position by means of the base plate lifting arms 140 and is latchingly secured in this position by means of the latch 126. Likewise the movable side wall former 112 is held in forwardly disposed inoperative position by means of the tension springs 122 and the associated cross yoke 117 and the arm 118 thereof are in forwardly shifted position. Since the head-frame actuating arm 93 is in downwardly disposed position, the driving arm 100 is likewise in downwardly disposed position and out of operative engagement with the hook detent 120 of the cross yoke arm 118, all as best seen in Figure 22.

The operator thereupon folds a glue-coated side wall forming strip C in the manner previously described and inserts the same within the machine between the open side wall forming members 109, 112, and then places a flat bottom blank member B on top of the side wall forming members 109, 112, against the guide member 111. The operator then steps on the pedal 90, depressing the pedal arm 89 and swinging the base plate lifting arms 140 downwardly. Since the base plate 123 is secured beneath the latch detent 126, the base plate will remain in operative position. Meanwhile the rock shaft 87 will be swung, bringing the cross bar of the saddle 88 into abutting engagement with the projection 96 of the actuator arm 93. As the operator continues the application of pressure on the foot pedal, the rotative movement of the rock shaft 87 will be transmitted through the saddle member 88 to the actuating arm 93, swinging the latter upwardly and forwardly against the action of the spring 93', the yoke end 94 and the associated pin 95 thereof sliding forwardly and downwardly over the head frame bracket 83, thereby swinging the head-frame 78 and the associated former 84 downwardly into operative engagement with the box-forming blank B, forcing the latter downwardly between the side wall forming strip C in the formation of a container shell D, in substantially the same manner as above described in connection with the previous embodiment.

As the actuating arm 93 swings upwardly, the driving arm 100 will also be swung upwardly into the path of the detent catch 120. As has been previously pointed out, the driving arm will be continuously rocked backwardly and forwardly under the influence of the cam 106. The driving arm will hence engage the detent catch 120 and draw the cross-yoke 117 backwardly, moving the side wall former 112 also backwardly into close position against the action of the springs 122. As the cross-yoke 117 moves backwardly, the cam-like shoulder 136 will ride over the upper end of the trip-lever 133, which will, in turn, pivot reversely against the action of the spring 135, the pin 134 of the trip-lever riding freely in the slot 130 of the latch end-plate 129 and when released will be quickly urged into normal position again.

As the cam 107 continues its rotation, the driving arm 100 will swing forwardly again, permitting the cross-yoke 117 and the associated side wall former 112 to return to original position. As the cross-yoke 117 returns, the cam shoulder 136 thereof will engage the trip-lever 133 and swing it forwardly, whereupon the pin 134 will engage the end wall of the slot 130 and urge the latch 126 backwardly out of engagement with the base plate 123, thereby permitting the latter to swing freely downwardly until the stop projection 124 thereof comes into abutting engagement with the under face of the top plate 76.

Simultaneously with the return movement of the side wall former 112, the operator releases the pedal 90, permitting the actuating arm 93 to swing downwardly, thereby lifting the head-frame 78 and the associated former 84. The completed container shell E will then drop freely through the aperture 108 as the base plate 123 swings downwardly and will slide therefrom into any suitable hopper or onto any conventional conveyer, whereupon it is in condition to receive the "extension" member A and any other decorative trimmings as may be desired.

In order to allow the container shell D to slide completely from the base plate 123, the operator may maintain sufficient foot pressure on the pedal 90 to hold it against action of the spring 92 after the head-frame 78 has reached the backward limit of its travel. As soon as the container portion has slid from the base plate 123, the pedal 90 may be entirely released, whereupon the rock shaft 87 will complete its rotatory movement swinging the arms 140 upwardly, bring the rollers 142 thereof into operative engagement with the under face of the base plate 123 and swing the latter upwardly into initial position, in which position it will again be securely held by the latch 126 which has likewise returned to initial position, whereupon the machine is conditioned for the repetition of the entire series of operations above described in the formation of a second container shell.

It should be noted that in forming the container shell D, either by hand or by the machines, as above described, the side wall forming strip C is first formed and the bottom blank B, with its marginal tabs molded, so to speak, within the side wall forming strip C, whereby accurate conformation to the desired side wall curve or contour is obtained and, at the same time, increased strength and rigidity are imparted thereto. In addition to this, the present invention for the first time, so far as we are aware, provides a container of the type stated, which, in completed form, is a substantially unitary structure and has a juncture between its bottom and side wall which is wholly sealed and "leak-proof," as it may be said.

It should be understood that changes and modifications in the form, construction, arrangement, method, process, and combination of the several parts of the container and means for making the same may be made and substituted for those herein shown and described without departing from the nature and principle of our invention.

Having thus described our invention, what we claim and desire to secure by Letters Patent is—

1. The method of forming a heart-shaped box which comprises stamping out a heart-shaped bottom member, forming a continuous heart-shaped side wall member symmetrical with and smaller than the bottom member, cutting a plurality of tabs around the margin of the bottom member, and externally holding the wall member in shape while simultaneously forcing the bottom member downwardly into the side wall member and deforming the tabs to conform to the arcuate shape of, and lie smoothly against, the inner faces of the side wall member.

2. The method of forming a container having a curved side wall which comprises stamping out a bottom member having a continuously curved periphery, forming a continuous side wall member curved to a shape symmetrical with and smaller than the bottom member, cutting a plurality of tabs around the margin of the bottom member, and externally holding the wall member in shape while simultaneously forcing the bottom member downwardly into the side wall member and deforming the tabs to conform to the arcuate shape of and lie smoothly against the inner faces of the side wall member.

3. The method of forming a box which comprises stamping out a bottom member having arcuate edge portions, forming a continuous side wall member similar in shape to and smaller than the bottom member, cutting a plurality of tabs around the margin of the bottom member, and externally holding the wall member in shape while simultaneously forcing the bottom member into the side wall member and deforming the tabs to conform to the shape of, and lie smoothly against, the inner faces of the side wall member.

4. The method of forming a box which comprises stamping out a bottom member having an arcuate peripheral contour, forming a continuous side wall member similar in shape to and smaller than the bottom member, cutting a plurality of tabs around the margin of the bottom member, and externally holding the wall member in shape while simultaneously forcing the bottom member into the side wall member and deforming the tabs to conform to the shape of, and lie smoothly against, the inner faces of the side wall member.

5. The method of forming a box which comprises stamping out a bottom member having arcuate edge portions, forming a continuous side wall member similar in shape to and smaller than the bottom member, cutting a plurality of tabs around the margin of the bottom member, externally holding the wall member in shape, and forcing the externally held wall member and bottom member together for inserting the bottom member within the side wall member and simultaneously deforming the side wall tabs to conform to the shape of, and lie smoothly against, the inner faces of the side wall member.

6. The method of forming a box which comprises stamping out a bottom member having arcuate edge portions, forming a continuous side wall member similar in shape to and smaller than the bottom member, cutting a plurality of tabs around the margin of the bottom member, externally holding the wall member in shape, forcing the externally held wall member and bottom member together for inserting the bottom member within the side wall member and thereby bending the tabs to lie against said side wall member, and pressing the side wall member and the tabs together for conforming the tabs to the shape of the inner face of the side wall member.

WILLIAM ENGEL.
HARRY A. REINHARDT.